June 8, 1948.                    T. ABRAMS ET AL                    2,442,913
                                  LENS HEATER
Filed Sept. 18, 1944                                            2 Sheets-Sheet 1
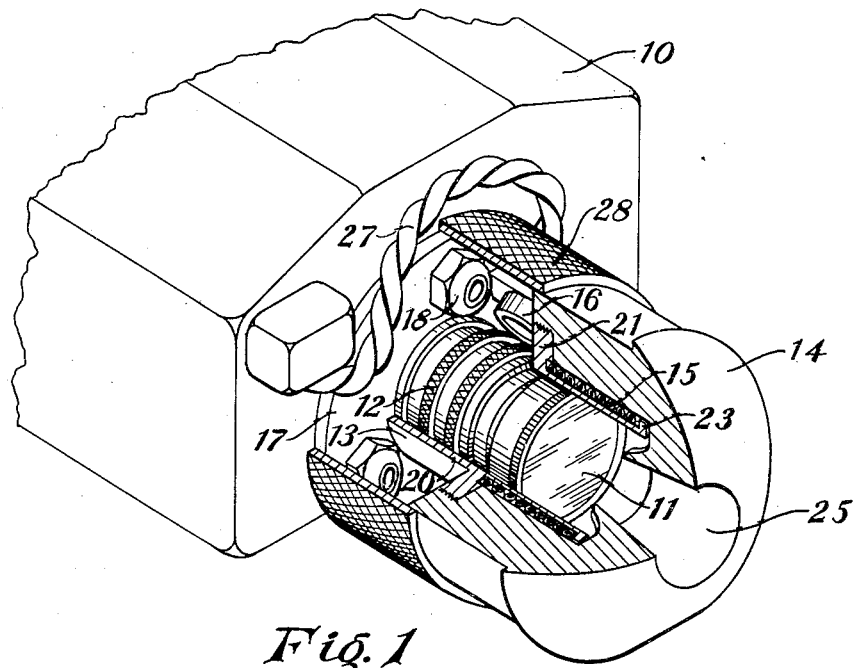
Fig. 1
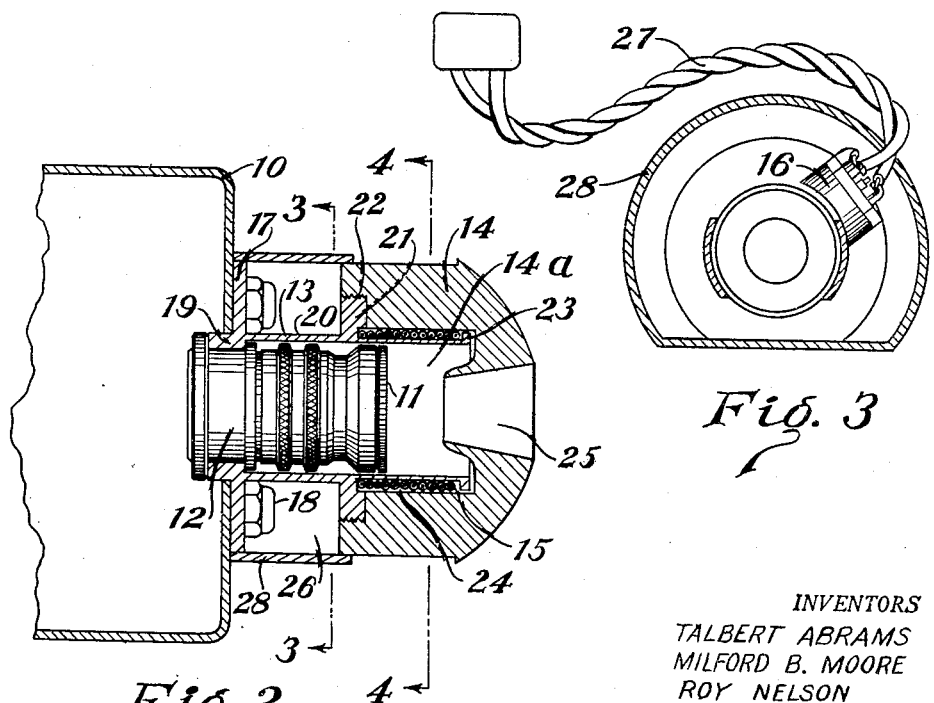
Fig. 2
Fig. 3
INVENTORS
TALBERT ABRAMS
MILFORD B. MOORE
ROY NELSON
BY Carroll R. Taber
      ATTY.

June 8, 1948.  T. ABRAMS ET AL  2,442,913
LENS HEATER
Filed Sept. 18, 1944  2 Sheets-Sheet 2

INVENTORS
TALBERT ABRAMS
MILFORD B. MOORE
ROY NELSON
BY Carroll R. Jaber
ATTY.

Patented June 8, 1948

2,442,913

UNITED STATES PATENT OFFICE 2,442,913

LENS HEATER

Talbert Abrams and Milford B. Moore, Lansing, and Roy Nelson, East Lansing, Mich., assignors to Talbert Abrams, doing business as Abrams Instrument Company, Lansing, Mich.

Application September 18, 1944, Serial No. 554,616

3 Claims. (Cl. 219—19)

This invention relates to devices for heating lenses in order to prevent, or at least minimize condensation of moisture thereon.

At the present time numerous devices which employ lenses, such as cameras, bombsights, and the like, are used in airplanes. The lenses, being made of glass, are poor conductors of heat, and when thoroughly chilled require considerable time to warm up. Consequently, when an airplane carrying instruments equipped with lenses flies at a high cold level for a time and then rapidly descends to a lower warmer level, moisture condenses on the lenses, and seriously affects the light transmitting qualities thereof. Many attempts have been made to remedy this condition. Attempts have been made to heat the lenses, but because glass is such a poor conductor of heat these attempts have not been successful.

The object of the present invention is to overcome the difficulties encountered in previous devices of this character and eliminate the condensation of moisture on the lenses.

This result is attained by not only heating the lenses by direct conduction and radiation of heat from a suitable source of heat, but by heating the air adjacent the lenses to a temperature above the dew point, which in turn indirectly heats, at least the outer surface of the lenses.

The present manner of eliminating condensation of moisture on the lenses is made practicable by means of a housing about the lens or lenses, which traps or "bottles," and more or less stagnates a small quantity of air in front of the front lens element. Only this small quantity of air needs to be heated, thereby eliminating the need for a heating coil of great heating capacity.

For a more complete description of the present invention, reference is made to the following specification and accompanying drawings, wherein:

Figure 1 is a fragmentary isometric view of a camera with one form of the invention in place thereon;

Figure 2 is a fragmentary cross-sectional view of the device shown in Figure 1;

Figure 3 is a fragmentary cross-sectional view taken on substantially the line 3—3 of Figure 2;

Figure 4:
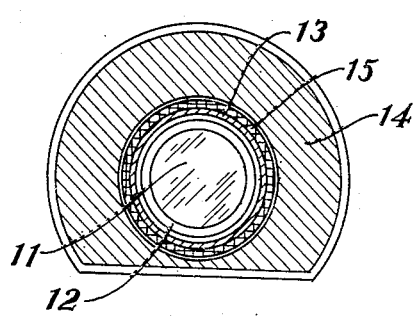
Figure 4 is a cross-sectional view taken on substantially the line 4—4 of Figure 2.

Referring now more in detail to the accompanying drawings, and particularly to Figures 1 to 4 thereof, the invention is disclosed as embodied in a conventional camera adapted to be mounted in a fixed position within an airplane, although it will be evident that the invention is not necessarily limited to such devices. The camera body is designated by the numeral 10. It is provided with a suitable lens mounted in a lens barrel 12. The lens conventionally includes a front lens element 11 and a rear lens element (not shown) spaced rearwardly therefrom. In the present instance the lens barrel is mounted in a fitting which becomes a part of the heating apparatus of the present invention, as will be more fully disclosed presently.

The lens heater comprises in general a support 13, a nose portion 14, a heating coil 15, and a thermostat 16. The support 13 preferably is formed from one piece of metal and comprises a plate 17 of circular shape attached to the front of the camera by nuts 18. Integral with the plate is an annular flange 19 which supports the lens barrel 12, as will be apparent in Figure 2. Extending forwardly from the plate 17 is a sleeve which receives the lens barrel 12. The sleeve 20 is of slightly greater internal diameter than the external diameter of the lens barrel 12. The sleeve 20 extends a substantial distance forwardly of the lens 11, as clearly indicated in Figures 1 and 2. Intermediate the axial extremities of the sleeve 20 is a flange 21 provided on its exterior surface with threads 22. Another radial flange 23 is formed on the extreme forward end of sleeve 20 so as to provide an annular recess 24 of relatively limited radial extent between the flanges 21 and 23. This recess receives the heating coil 15 which is composed of suitable electrical resistance wire wrapped helically about the sleeve.

The nose 14 is provided with an opening 25 in its forward end of somewhat smaller diameter than the diameter of the lens 11. The opening 25 should be of sufficient extent so as not to interfere with the light gathering powers of the lens. Preferably the opening tapers outwardly and forwardly. The front wall of the nose 14 in which the opening 25 is located is spaced a substantial distance from the lens 11, as will be clearly seen in Figure 2, so as to provide a recess 14a of substantially greater radial extent than that of the lens between the lens and the front wall of the nose. This recess is of large enough diameter to slide over the flange 23 and heating coil 15 so as to house and protect the same. The rear end of the nose 14 is internally threaded to seat upon the threads 22 on the flange 21. The rear end of the nose terminates approximately flush with the rear surface of the flange 21.

By virtue of the previously described construction of the nose it will be seen that a relatively deep annular recess 26 surrounds the sleeve 20 of the heater. This recess is adapted to house a suitable thermostat, 16, mentioned above, which is located in heat exchange relation to the sleeve 20. The sleeve 20 is, of course, heated by the heating coil 15 to a substantially uniform temperature throughout and some heat therefrom is transmitted to the thermostat 16. The thermostat is electrically connected in series with the heating coil 15 and is provided with a suitable connection 27, which may be plugged into any source of electrical current. In the present instance it is connected, as shown in Figure 1, to suitable connections on the camera body. The camera is electrically driven so that it is a simple matter to take current from the same source that drives the camera motor to operate the heating coil.

The annular recess 26 in which the thermostat is located is enclosed by an annular sleeve 28 surrounding the same. The sleeve may be slid axially onto the nose 14 to provide access to the recess 26 and the thermostat 16. The cover is primarily designed to permit setting of the camera lens.

When a plane carrying a camera equipped with the above described heating apparatus is flying at relatively high, cold altitudes, the electric current is turned on in the heating coil 15 which heats the sleeve 20, the nose 14, the lens barrel 12, and the lens. Heat conducted to the lens barrel by the sleeve 20 warms the air in the barrel between the lens element, and to some extent the lens elements themselves. Heat is also transmitted by conduction, convection and radiation to the air within the recess 14a in front of the lens. The relative humidity of this small quantity of air is lowered to a very considerable degree. Also, the warm air in the recess, being very close to the lens element 11, in turn heats the lens element 11 to a temperature above the dew point. Even though the airplane is travelling at a relatively great rate of speed, there is little or no tendency for the air in the recess 14a to be disturbed, because of the relatively restricted opening 25 and the streamlined shape of the nose 14. Thus, when the airplane descends to a lower, warmer and more humid atmosphere, there will be no tendency for moisture to deposit on the lens and reduce its ability to transmit light.

Figure 5:
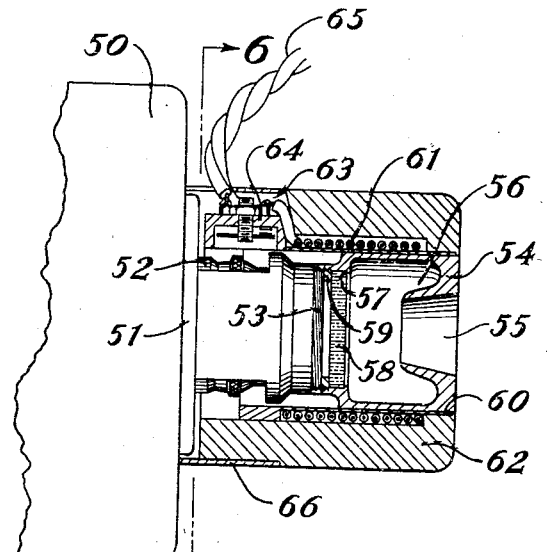
Figure 5 is a cross-sectional view similar to Figure 2 showing a modified form of the invention.
Figure 6:
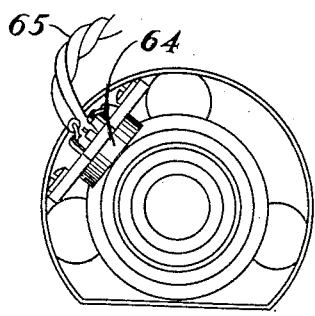
Figure 6 is a cross-sectional view taken on substantially the line 6—6 of Figure 5.

Figures 5 and 6 illustrate a somewhat modified form of the invention. This form differs primarily in the fact that it includes as a part thereof a color filter, and thereby necessitates certain changes in the design of the heating apparatus. Also, no attempt has been made to streamline the housing in this particular modification.

The form of the invention shown in Figures 5 and 6 is illustrated as being attached to a camera 50 of a design such as was previously disclosed. Attached to the front wall of the camera is a support 51 which has a portion surrounding the lens barrel 52 and extending a short distance forwardly thereof. The front end of the support 51 is threaded at 53 to receive an internally threaded inner nose piece 54. This nose piece is provided with a front opening 55 similar to opening 25. It also has an enlarged annular recess 56. Near the rear end of the recess is a relatively narrow shoulder 57 against which the color filter 58 is seated. The color filter is held in place by a ring 59 threaded into the nose piece 54.

A generally cylindrical sleeve 60 surrounds the nose piece 54. A heating coil 61 is wound around sleeve 60. The heating coil is housed within an outer casing 62 in telescopic relation with the sleeve 60. A relatively large recess 63 is provided in the casing 62 adjacent its rear end to receive a thermostat 64. This thermostat is connected in series relationship with the heating coil 61, and is connected by cables 65 to a suitable source of electrical current. The recess is enclosed by means of a sliding cover 66 which may be opened to permit access to the thermostat and lens.

Operation of the form of the invention shown in Figures 5 and 6 is quite similar to that previously described. The lens and color filter are to some extent heated by heat from the heating coil 61. The air within the recess 56 is also kept warm by heating coil 61. Condensation of moisture is thereby eliminated.

Figure 7:
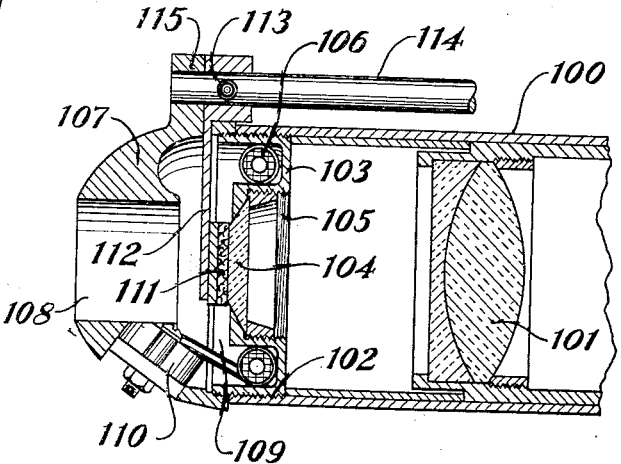
Figure 7 is a fragmentary cross-sectional view of a still further modified form of the invention.
Figure 8:
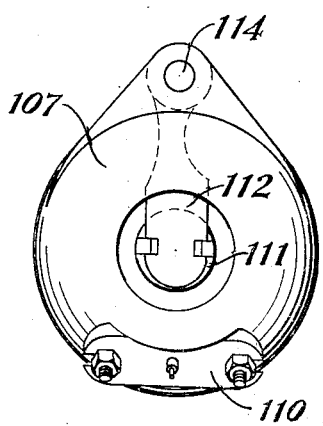
Figure 8 is a front elevational view of the same.

Figures 7 and 8 illustrate the invention applied to a telescopic bombsight used for dive bombing. The bombsight comprises an elongated tubular casing 100 having adjacent its front end a lens element 101. The forward end of the tubular casing 100 is internally threaded at 102 to receive an annular heater and cover glass support 103 of generally U-shaped cross-section. A cover glass 104 is mounted in the support 103 and is held in place thereon by means of a threaded ring 105.

A coiled heating element 106 is bent into generally circular shape and located in the U-shaped annular recess in the mount 103.

A nose piece 107 is threaded onto the forward end of the outer wall of the lens mount, as indicated in Figure 7. Preferably the nose piece is bullet shaped or streamlined on its exterior surface and it is provided with a sight opening 108 in the front end thereof. The sight opening is axially aligned with the lens 104. The nose is spaced a substantial distance from the lens so that an annular recess 109 is provided surrounding the lens in which air can be trapped in a manner similar to that described in connection with the previous modifications.

A thermostat 110 is mounted in a suitable opening cut in the side of the nose piece 107 and is connected in circuit with the heating coil 106.

In order to keep the cover glass free from dirt, which might collect thereon, the present invention has been provided with a lens wiper which will clear the lens dirt if dirt deposits thereon. The wiper comprises a thin pad of asbestos 111 of approximately the same size as the lens 104. It is carried on the lower end of an oscillatory arm 112 and the latter is pinned by a pin 113 to an operating rod 114. The latter is mounted in suitable bearings paralleling the axis of the bombsight. Only one of these bearings 115, which is located in the nose piece 107, is shown. The other bearing would be located at the rear of the bombsight and preferably the rod 114 is provided with a handle or knob, not shown, for rotating the same.

It will be apparent that the operation of the heating apparatus disclosed in connection with Figures 7 and 8 is the same as that previously described. Heating element 106 heats the lens to some extent and also the air trapped within the recess 109. Heat is also transmitted by conduction through the tubular casing 100 to the space between lens element 101 and cover glass 104 as well as to the lens element 101 itself. That eliminated the possibility of moisture depositing on the lens element 101.

From the foregoing it will be seen that this invention overcomes the difficulties experienced with previous lens heaters by trapping and heating only a small quantity of air in the vicinity of the lens elements rather than to attempt to heat the lens entirely by direct radiant or conducted heat.

The scope of the invention is indicated in the appended claims.

We claim:

1. An optical instrument comprising a blunt-nosed stream-lined air-deflecting turbulence-preventing tubular housing having a transparent member intermediate its ends extending transversely of said tubular housing, said housing having a relatively small light aperture in the center of the nose and a relatively large trapped air chamber between the aperture and the transparent member, the walls of the aperture being spaced forwardly from the transparent member a distance at least equal to the radius of the transparent member, and an electrical heating element located in said housing adjacent the transparent member.

2. An optical instrument as defined in claim 1 wherein said heating element is located in heat exchange relation to the air within said trapped air chamber.

3. An optical instrument as defined in claim 1 wherein a portion of the heating element surrounds said transparent member in closely spaced relation to the periphery thereof.

TALBERT ABRAMS.
MILFORD B. MOORE.
ROY NELSON.

REFERENCES CITED

The following references are of record in the file of this patent:

UNITED STATES PATENTS

| Number | Name | Date |
| --- | --- | --- |
| 1,791,254 | Von Brockdorff | Feb. 3, 1931 |
| 2,102,487 | Schwarz | Oct. 29, 1935 |
| 2,342,513 | Gaty | Feb. 22, 1944 |
| 2,345,365 | Steiner | Mar. 28, 1944 |